United States Patent
Stendel et al.

(10) Patent No.: US 11,450,457 B2
(45) Date of Patent: Sep. 20, 2022

(54) METHOD FOR FASTENING A CONTACT ELEMENT IN AN ELECTRICAL COMPONENT, AND ELECTRICAL COMPONENT HAVING A CONTACT ELEMENT

(71) Applicant: TDK ELECTRONICS AG, Munich (DE)

(72) Inventors: Thomas Stendel, Deutschlandsberg (AT); Jan Ihle, Raaba-Grambach (AT); Gerald Kloiber, Feldkirchen (AT); Thomas Bernert, Deutschlandsberg (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 16/963,183

(22) PCT Filed: Jan. 31, 2019

(86) PCT No.: PCT/EP2019/052396
§ 371 (c)(1),
(2) Date: Jul. 17, 2020

(87) PCT Pub. No.: WO2019/149828
PCT Pub. Date: Aug. 8, 2019

(65) Prior Publication Data
US 2021/0125757 A1 Apr. 29, 2021

(30) Foreign Application Priority Data

Jan. 31, 2018 (DE) .......................... 102018102132.1

(51) Int. Cl.
*H01C 1/14* (2006.01)
*B23K 26/21* (2014.01)
(Continued)

(52) U.S. Cl.
CPC .......... *H01C 1/1413* (2013.01); *B23K 26/21* (2015.10); *G01K 1/14* (2013.01); *G01K 7/22* (2013.01);
(Continued)

(58) Field of Classification Search
CPC ........ H01C 1/1413; H01C 7/04; H01C 17/28; H01R 4/029; H01R 12/53; H01R 43/0221; G01K 1/14; G01K 7/22; B23K 26/21
See application file for complete search history.

(56) References Cited

U.S. PATENT DOCUMENTS 5,300,755 A * 4/1994 Nishitani ............... B23K 26/22
219/121.63
5,541,365 A * 7/1996 Sugiura .................. B23K 26/06
174/94 R
(Continued)

FOREIGN PATENT DOCUMENTS

CN 1717292 A 1/2006
CN 107005013 A 8/2017
(Continued)

OTHER PUBLICATIONS

Chinese Office Action dated Mar. 22, 2022, of counterpart Chinese Patent Application No. 201980010899.6, along with an English translation.
(Continued)

*Primary Examiner* — Kyung S Lee
(74) *Attorney, Agent, or Firm* — DLA Piper LLP (US)

(57) ABSTRACT

In a method for fastening a contact element (5, 6) in an electrical component (1), a contact element (5, 6) is arranged on a contact surface (3, 4) of a base body (2) of the component (1) and a laser beam (18) is directed onto a region (16, 17) of the contact element (5, 6) in such a way
(Continued)

that the base body (2) is not located in the beam direction (24) of the laser beam (18). The contact element (5, 6) is partially melted by the laser beam (18), so that the molten material (7, 8) wets the contact surface (3, 4) and produces fastening of the contact element (5, 6) on the contact surface (3, 4).

18 Claims, 10 Drawing Sheets

(51) Int. Cl.
*G01K 1/14* (2021.01)
*G01K 7/22* (2006.01)
*H01C 7/04* (2006.01)
*H01C 17/28* (2006.01)
*H01R 4/02* (2006.01)
*H01R 12/53* (2011.01)
*H01R 43/02* (2006.01)

(52) U.S. Cl.
CPC .............. *H01C 7/04* (2013.01); *H01C 17/28* (2013.01); *H01R 4/029* (2013.01); *H01R 12/53* (2013.01); *H01R 43/0221* (2013.01)

(56) References Cited

U.S. PATENT DOCUMENTS

| | | | |
|---|---|---|---|
| 5,877,472 A * | 3/1999 | Campbell | H01R 4/029 219/121.64 |
| 6,264,363 B1 | 7/2001 | Takahashi et al. | |
| 6,531,676 B2 | 3/2003 | Schwemmer et al. | |
| 7,504,604 B2 | 3/2009 | Rossopoulos et al. | |
| 8,228,160 B2 * | 7/2012 | Kloiber | G01K 7/223 338/22 R |
| 8,704,123 B2 | 4/2014 | Rosenkranz | |
| 9,496,077 B2 * | 11/2016 | Naka | H01C 1/14 |
| 10,319,493 B2 * | 6/2019 | Kloiber | B23K 20/023 |
| 2001/0011418 A1 | 8/2001 | Schwemmer et al. | |
| 2009/0173526 A1 * | 7/2009 | Kloiber | G01K 7/22 174/260 |
| 2016/0055935 A1 * | 2/2016 | Kloiber | H01C 1/144 174/68.1 |
| 2017/0219440 A1 * | 8/2017 | Strallhofer | G01K 7/22 |
| 2017/0312853 A1 | 11/2017 | Kabelitz et al. | |

FOREIGN PATENT DOCUMENTS

| | | |
|---|---|---|
| DE | 19934738 A1 | 1/2000 |
| DE | 10002703 A1 | 8/2001 |
| DE | 102010018608 A1 | 11/2011 |
| DE | 102010018608 A1 | 4/2014 |
| EP | 2732899 A1 | 5/2014 |
| JP | S63102214 A | 5/1988 |
| JP | 2001229985 A | 8/2001 |
| JP | 2004-063204 A | 2/2004 |
| JP | 2004172206 A | 6/2004 |
| WO | WO2016012311 A1 | 1/2016 |

OTHER PUBLICATIONS

A. Feteira, "Negative Temperature Coefficient Resistance (NTCR) Ceramic Thermistors: An Industrial Perspective," Journal of The American Ceramic Society, vol. 92, No. 5, pp. 967-983, 2009.

* cited by examiner

A-A

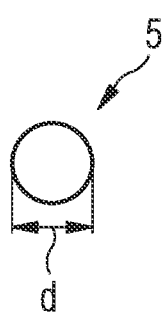 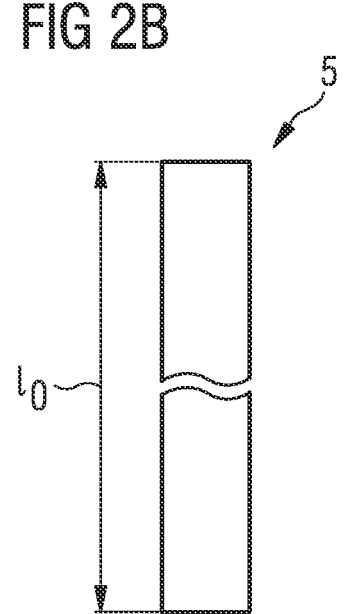
FIG 2A  FIG 2B
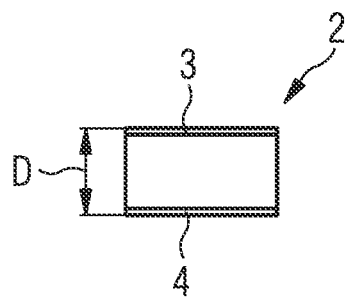 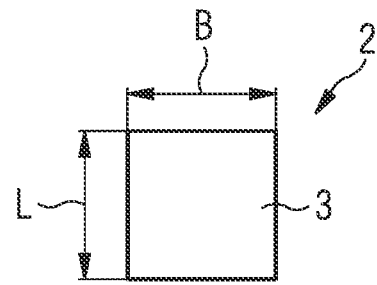
FIG 3A  FIG 3B

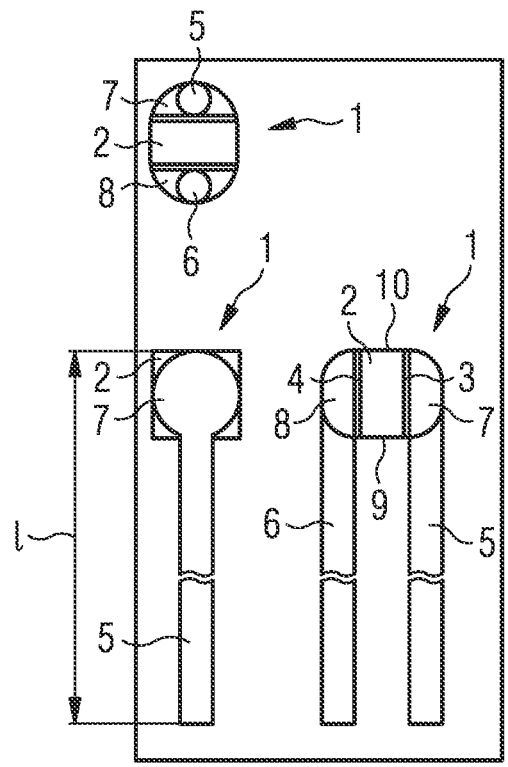
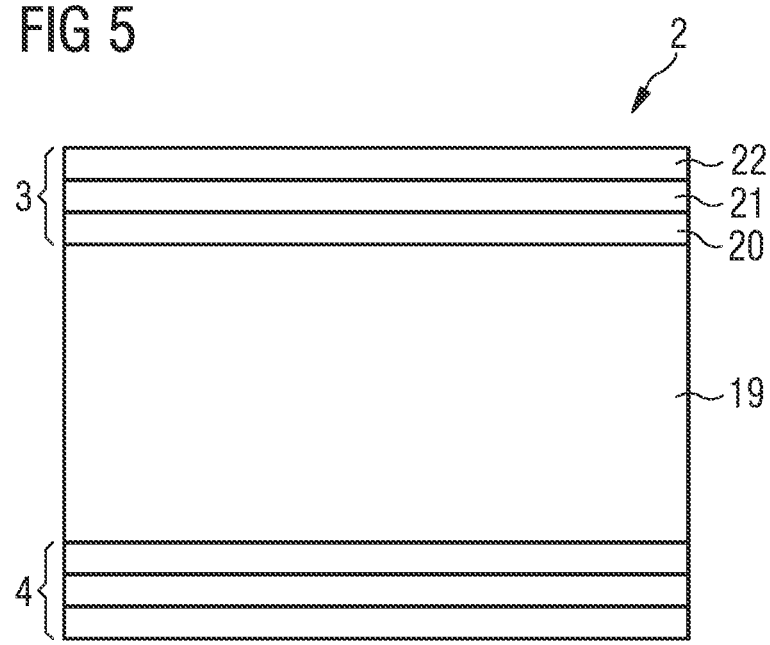

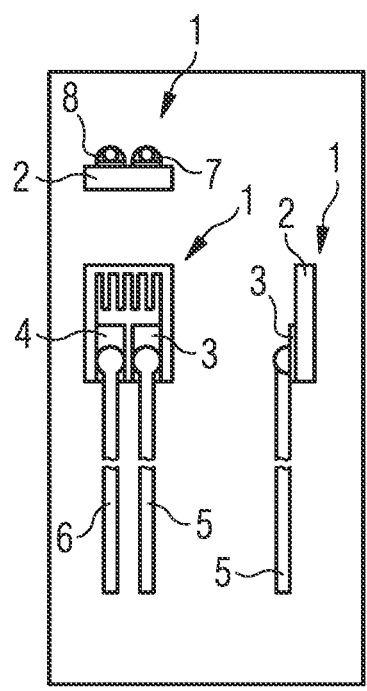

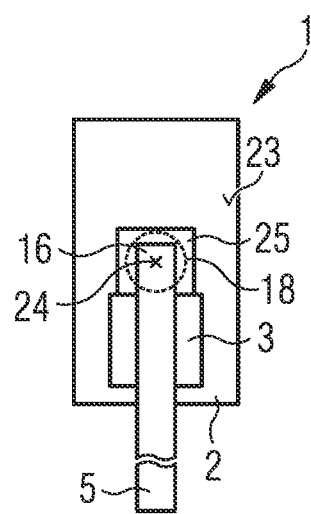
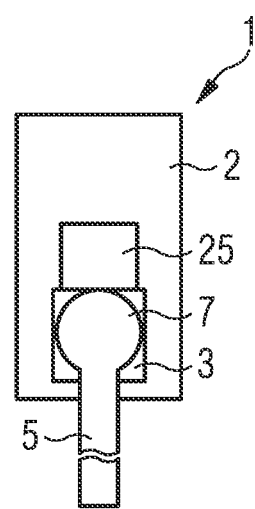

METHOD FOR FASTENING A CONTACT ELEMENT IN AN ELECTRICAL COMPONENT, AND ELECTRICAL COMPONENT HAVING A CONTACT ELEMENT

FIELD

The present invention relates to a method for fastening a contact element in an electrical component. For example, the component is designed as a temperature sensor. The component can comprise a ceramic thermistor (NTC) chip as a base body.

BACKGROUND

Connecting wires are often fastened by soldering on a burned-in silver metallization of the base body to electrically contact the base body. The usage temperature of a soldered bond is limited by the melting temperature of the solder, however. High-lead-content solders have a melting temperature of approximately 300° C. and most lead-free solders already melt at temperatures of 230° C. Soldered connections are not sufficiently reliable in the case of frequent alternating temperature stresses. Moreover, many solder materials tend to migrate in a humid or wet environment.

Furthermore, connecting wires are also fastened on a burned-in gold metallization by sintering a metallic sinter paste. This is typical in particular for higher usage temperatures of 250° C. to 300° C. However, this type of production is linked to high costs because of the gold material and the complex process control having paste application, paste drying, and burning in.

Fastening by welding on the connecting wires has also already been proposed, for example, in the document WO 2016/012311 A1. However, it has been shown that in such welding methods, the risk of the destruction of the base body and/or the metallization is high and the production of a reliable component is linked to high process costs.

SUMMARY OF THE DISCLOSED EMBODIMENTS

It is an object of the present invention to specify an improved method for fastening a contact element in an electrical component and to specify an electrical component having a contact element, which has increased reliability.

According to a first aspect of the present invention, a method is specified for fastening a contact element in an electrical component. The component is designed, for example, as a temperature sensor. The method is suitable for a variety of components, for example, NTC thermistors, PTC thermistors, or varistors. The method is also suitable in particular for ceramic multilayered components.

In the method, a base body and a contact element are provided. In particular, the contact element can be metallic. The contact element is, for example, a wire. The contact element can also be formed alternatively, for example, in the form of a grating or plate. The base body comprises, for example, a ceramic base material and can be formed multilayered in particular. One single one or two or more contact elements can be fastened on the base body by such a method.

The base body can comprise at least one contact surface. The contact surface is, for example, a metallization. In particular, the contact surface can be arranged on a lateral surface of the base body. The base body can comprise two such contact surfaces, which are provided, for example, on opposing lateral surfaces of the base body. The contact surface can be single-layer or multilayered. For example, the contact surface comprises a layer made of a metal having the same or a higher melting point than the contact element.

Two or more contact elements can be provided in the method, which are each arranged and fastened on one of the contact surfaces. Multiple contact elements can also be arranged and fastened on a shared contact surface. Alternatively, two separated contact elements, which are each fastened on one of the contact surfaces, can also be formed from one contact element during the method.

The at least one contact element comprises nickel or consists of nickel, for example. Nickel is very suitable as a material, since it is relatively cost-effective and has a high migration resistance with sufficient oxidation resistance.

In the method, the contact element is arranged on the contact surface of the base body, in particular on a metallization of the base body. For example, the contact element and/or the base body is held by one or more grippers.

A laser beam is then directed onto a region of the contact element. The laser beam is oriented in this case in such a way that the base body and in particular the contact surface is not struck by the laser beam even after melting off of a part of the contact element, in particular the melting off of the region struck by the laser beam. In particular, the base body is not located in the beam direction of the laser beam. Damage to the base body can thus be avoided.

For example, the laser beam is oriented in such a way that it leads completely past the base body. In particular, the laser beam can be oriented in such a way that the beam direction extends in parallel to a lateral surface of the base body at a distance from the base body. Depending on the design and arrangement of the contact element, the laser beam extends, for example, in a top view of the contact surface, in such a way that the beam direction does not overlap with the contact surface, or the beam direction extends in parallel to the contact surface and at a distance to the contact surface.

In a further step of the method, the contact element is partially melted by the laser beam, in particular the region which is struck by the laser beam. The molten material wets the contact surface. After the hardening of the molten material, the contact element is thus fastened on the contact surface of the base body.

The region of the contact element which is struck by the laser beam melts and thus withdraws entirely or partially from the laser beam, so that no or only minor energy absorption of the laser light by the contact element still takes place. It is thus a self-stopping heating process. Since the base body is not located in the beam direction of the laser beam, direct heating of the base body also does not result after the melting of the region of the contact element. In particular, the contact surface of the base body is also not directly heated.

This results in a facilitation of the process control, since damage to the component can be prevented without exact setting and monitoring of the laser energy being necessary. The energy absorption is ended immediately after the melting off of the region, so that the material can cool again directly after the melting.

The molten material thus forms a connecting material, which fastens the contact element on the base body. In particular, the hardened molten material can be provided as a welding bead. In this case, it can be a protrusion in the form of a spherical segment, for example, a hemisphere.

According to one embodiment, the contact element is arranged in such a way that the region on which the laser beam strikes does not completely overlap with the base body in a top view of the contact surface, i.e., protrudes beyond the base body. For example, the contact element is positioned in such a way that the protruding region is oriented upward. After the melting procedure, the protrusion can be completely or partially removed. The protruding region can be in particular one end of the contact element.

For example, in this embodiment in a top view of the contact surface, the beam direction extends nonoverlapping with the base body. In particular, the laser beam can extend in parallel to an end side at a distance to the base body, so that the protruding end is struck.

According to one embodiment, the region on which the laser beam strikes extends away from the contact surface in a direction perpendicular to the contact surface. In a top view of the contact surface, the region can overlap with the contact surface. For example, the region is an end of the contact element which is bent outward away from the contact surface. The region can also be a middle region of the contact element which, for example, leads away in a wave shape from the contact surface and leads back to the contact surface again.

In this embodiment, the beam direction extends, for example, in parallel to the contact surface at a distance to the contact surface, so that the laser beam strikes the region leading away.

In one embodiment, the region which is struck by the laser beam does not lead away from the contact surface and also does not protrude beyond the base body. In particular, the region can abut the contact surface. In this embodiment, for example, the beam direction extends in parallel to the contact surface at a small distance to the contact surface.

Two or more contact elements can also be provided in the method. The contact elements can be fastened using the above-described method. For example, each of the contact elements comprises a protruding end, which is melted to produce the fastening.

In a first variant of the method, the laser beam is oriented in such a way that two or more contact elements are located in the beam direction of the laser. Regions of multiple contact elements can thus be melted off by the same laser beam without repositioning of the laser or the arrangement being required.

It can be in this case that in a first step, only one region of the first contact element is fully struck and melted off by the laser beam, while the second contact element is initially still shaded by the first contact element, so that the second contact element is only struck slightly or not at all by the laser beam. If the first contact element is partially melted and the molten material has entirely or partially withdrawn from the laser beam, the second contact element will also be struck by the laser beam, so that melting off of a region takes place. The regions are thus melted in succession, but by the same laser beam. This enables a very simple and cost-effective method for fastening two contact elements.

In a second variant, only one of the contact elements is in the beam direction of the laser, so that the laser beam does not strike the second contact element even after melting off of a region of the first contact element. In this case, after melting off of the region of the first contact element, the laser beam and/or the component can be reoriented in such a way that the laser beam strikes the second contact element after the reorientation and then melts off a region of the second contact element. Alternatively thereto, the partial melting off of the second contact element can be performed by means of a further laser simultaneously or after the partial melting off of the first contact element.

In one embodiment, the base body comprises a cutout and the contact element is arranged before the melting step in such a way that the region which is struck later by the laser beam is arranged on the cutout in a top view of the contact surface. In this case, it is possible to orient the laser beam in such a way that the beam direction leads through the cutout. This method facilitates in particular, in the case of multiple elements arranged adjacent to one another on a base body, the contact elements being fastened on the base body without acting on the other elements. For example, the base body is formed as a grid plate, in which multiple cutouts are arranged.

It is also possible, in order to produce two contact elements, to arrange one contact element on the base body and to divide the contact element by the melting into two separated contact elements. In this case, the contact element rests, for example, on two separate contact surfaces and a region between the contact surfaces is melted off, which then spreads onto the contact surfaces.

To prevent melting off of the contact surface from the base body due to the resulting heat, the contact surface can comprise at least one layer which has a higher melting point than the contact element. For example, the contact element comprises nickel and at least one layer of the contact surface comprises chromium.

The contact surface can also be constructed in multiple layers. For example, the contact surface contains at least one base layer. The base layer has, for example, a good migration resistance and oxidation resistance. For example, the base layer contains nickel or consists of nickel.

In one embodiment, still a further layer is arranged as oxidation protection on the base layer, for example, a nickel layer. Alternatively or additionally, this layer can also have a lower melting point than the contact element and can, for example, form an alloy with the molten material of the contact element. This layer contains or consists, for example, of gold or silver.

In one embodiment, still a further layer is located between a base material of the base body, for example, a ceramic, and the base layer, to prevent dealloying of the contact surface from the base body. The further layer in particular has a higher melting point than the base layer, so that this layer prevents complete melting off of the contact surface during the heating in the welding method. For example, the further layer contains chromium or consists of chromium.

For the sake of simplicity, a layer which at least predominantly contains nickel or gold or silver or chromium is also referred to as a nickel layer or gold layer or silver layer or chromium layer, respectively.

The contact surface can also comprise multiple layers made of the same material, between which a layer made of another material is arranged. The other material has, for example, a higher melting point, in particular a significantly higher melting point, than the contact element. The layers made of the same material have, for example, the same, an only slightly higher, or a lower melting point than the contact element. Additionally thereto, a layer having a lower melting point than the underlying layer can be arranged as the uppermost layer.

For example, the contact surfaces comprise two layers made of the material of a base layer, in particular two nickel layers. This can be advantageous for the case in which the further layer does not bond sufficiently stably to the base material of the base body. For example, a nickel layer can be arranged directly on the base material of the base body, a chromium layer can be arranged thereon, and a nickel layer can in turn be arranged thereon. A gold or silver layer can be arranged on the uppermost nickel layer.

The layers of the contact surface can be applied in a layer deposition method, for example, in a sputtering method or a vapor deposition method.

The above-described layer structure can also be advantageous for other methods for fastening a contact element. For example, in addition to the above-described method of laser welding by melting the contact element, the layer structure is also suitable for methods of deep welding, arc welding, thermal compression welding, and resistance welding.

In all embodiments, the region to be melted off can be selected in such a way that a stable fastening of the contact element on the base body is achieved by the solidified molten material. Furthermore, the region can be selected in such a way that the component is not significantly enlarged in its dimensions by the molten and solidified material, for example, is not significantly enlarged in its cross section.

For example, in the case of such a protruding region to be melted off, the length of the region is selected in such a way that after the melting, the solidified material does not protrude beyond the lateral surface of the base body. In this case, this means in particular that in a top view of the lateral surface, no protrusion of the solidified molten material is visible.

For example, the length of the protruding region before the melting off procedure is at most three times as large as the shortest extent of the lateral surface, for example, the width of the lateral surface. For example, the length of the protruding region before the melting off procedure is greater than the thickness of the contact element, for example, at least three times as long as the thickness of the contact element. This enables stable fastening of the contact element at an acceptable dimension of the component.

For example, the length of the region is selected in such a way that the solidified molten material does not protrude or does not protrude very much beyond the contact element toward the contact element in a direction perpendicular to the lateral surface. For example, the protrusion is not greater than twice the thickness of the contact element. With suitable selection of the length of the region, the protrusion can also be less than the thickness of the contact element or almost no protrusion can be present.

According to a further aspect of the present invention, an electrical component having a contact element is specified. The component can be produced by the above-described method and can comprise all structural and functional properties which were described in conjunction with the method. Vice versa, all properties of the component described here are also disclosed as properties of the method.

The contact element is fastened by a solidified molten material on the base body. The material is formed by a molten region of the contact element and thus comprises the same material composition as the contact element. In particular, the material can be formed by melting off a protruding or sticking-out region of the contact element.

The contact element is fastened, for example, on a contact surface of the base body. The contact surface does not have any damage due to thermal strain. This is achieved by the above-described method, in which the contact surface is not located in the beam direction of the laser beam and is thus also not struck by the laser beam after melting off of the region.

The contact element is fastened, for example, on a lateral surface of the base body. The contact element extends, for example, in a top view of the lateral surface, from a first edge in the direction of a second edge of the base body. The contact element does not protrude beyond the second edge. The contact element can protrude beyond the first edge. For example, one end of the contact element is located on the lateral surface. A contact element which does not comprise a protruding end at least in one direction is created by the above-described melting off of one of the protruding ends.

The total material volume of the molten region and the intact contact element on the lateral surface is greater than the volume which an intact contact element would occupy which extends from the first edge up to the second edge. It is thus recognizable that the solidified molten material is formed by melting a sticking-out or protruding region of the contact element.

The solidified molten material is provided, for example, in the form of a spherical segment. In particular, it is a welding bead.

The molten and solidified connecting material does not protrude beyond the lateral surface, for example, in a top view of the lateral surface. This can be achieved by suitable selection of a length of the molten region.

For example, the solidified molten material extends up to the second edge of the base body. This can be achieved by the above-described material in that the heat absorption is automatically stopped directly after melting off of a protruding region of the contact element, so that solidification of the molten material on the edge is enabled. In the case of direct heating of the base body, the connecting material would flow farther away from the edge.

As described above in conjunction with the method, the contact surface can comprise a multilayered structure. For example, the contact surface can comprise two nickel layers. A chromium layer can be provided between the nickel layers.

According to a further aspect of the present invention, an electrical component having a base body comprising a base material and a multilayered contact surface arranged thereon is specified. The contact surface is formed in particular for fastening of a contact element. The component can also comprise a contact element fastened on the contact surface. The contact surface comprises at least two layers having the same material, in particular nickel, or the two layers consist of nickel. A layer which has a higher melting point than the two layers is arranged between the two layers. For example, the layer comprises chromium or consists of chromium.

Still a further layer can optionally be arranged on this layer sequence. The further layer has, for example, a lower melting point than the two layers having the same material. For example, the further layer comprises gold or silver or consists of gold or silver.

Such a contact surface has a particularly high stability and enables an attachment of a further contact not only by way of the above-described laser melting method of a contact element, but also an attachment of a contact surface by other methods, for example, other welding methods.

The component can be produced by the above-described method and can comprise all structural and functional properties which were described in conjunction with the method or the component according to the further aspect. Vice versa, all properties of the component described here are also disclosed as properties of the method or the component according to the further aspect. However, the component is also disclosed independently of the above-described method.

The description of the subjects specified here is not restricted to the individual special embodiments. Rather, the features of the individual embodiments can be combined with one another—if technically reasonable.

The subjects described here are explained in greater detail hereafter on the basis of schematic exemplary embodiments.

BRIEF DESCRIPTION OF THE DRAWINGS

FIG. 2A shows a contact element for contacting a component in a sectional view,

FIG. 2B shows the contact element from FIG. 2A in a lateral view,

FIG. 3A shows a base body of a component in a sectional view,

FIG. 3B shows the base body from FIG. 3A in a lateral view,

FIGS. 4A-4E show method steps during the production of a contact of a component, FIG. 5 shows a base body having a multilayered contact surface, FIGS. 6A-6E show a further embodiment of the method for producing a contact, FIGS. 10A and 10B show a further embodiment of the method for producing a contact.

In the following figures, identical reference signs can refer to functionally or structurally corresponding parts of the various embodiments.

DESCRIPTION OF ONE OR MORE EMBODIMENTS

Figure 1A:
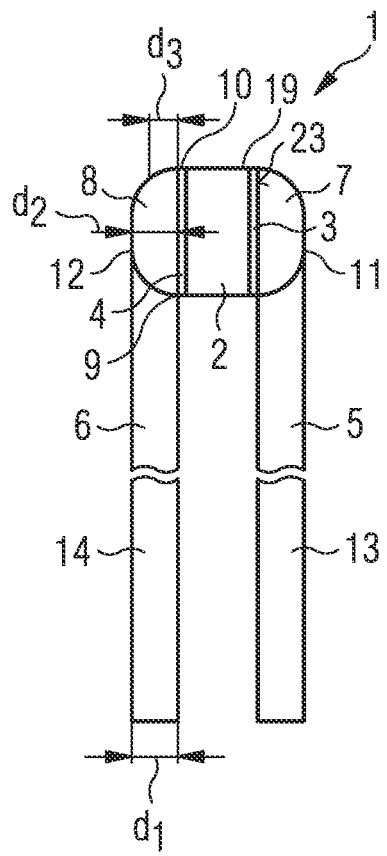
FIG. 1A shows an embodiment of a component in a lateral view.

FIG. 1A shows an embodiment of a component 1 in a lateral view. The component 1 is designed, for example, as a temperature sensor. The structure is also suitable in principle, however, for other electrical components.

The component 1 comprises a base body 2. The base body 2 comprises in particular a ceramic material as a base material 19. For example, the ceramic material is based on a spinel structure or perovskite structure. It can be a thermistor, in particular an NTC sensor, i.e., an NTC component. In particular, it is an NTC thermistor chip. The base body can also be a carrier, in particular a printed circuit board.

The base body 2 comprises two contact surfaces 3, 4 for electrical contacting. The contact surfaces 3, 4 are arranged on opposing sides of the base body 2. In particular, the contact surfaces 3, 4 are in direct contact with the base material 19 of the base body 2. The contact surfaces 3, 4 are in particular metallizations. The contact surfaces 3, 4 can each be constructed in multiple layers. The contact surfaces 3, 4 can comprise nickel as a material. In particular, nickel can be a base material of the contact surfaces 3, 4.

According to specific embodiments of the component 1, in this case this can be a platinum-containing metallization on an aluminum oxide ceramic, a silver-containing metallization on a PTC ceramic, or a nickel-containing or gold-containing metallization on an NTC ceramic.

The component 1 comprises two contact elements 5, 6, in particular metallic contact elements 5, 6, for electrical contacting. The contact elements 5, 6 can be formed as connecting wires. However, other forms of contact elements also come into consideration, for example, plates or grating-shaped contact elements, in particular stamped gratings. It can also be a stranded wire.

The contact elements 5, 6 are each fastened on one of the contact surfaces 3, 4 and electrically contact it. The contact elements 5, 6 are formed stably, for example, so that they can support the base body 2, in particular can hold it stably in the position shown. For example, the contact elements 5, 6 comprise nickel as a material. In particular, nickel can be a base material of the contact elements 5, 6. The contact elements 5, 6 can alternatively, for example, comprise an iron alloy or copper.

The contact elements 5, 6 are each fastened on a contact surface 3, 4 by means of a melted and subsequently solidified material 7, 8. The melting off of the material 7, 8 is performed, for example, by a laser beam. In particular, the fastening is produced by a welding method. The solidified molten material 7, 8 is formed in this case by partial melting off of the contact elements 5, 6. The solidified molten material 7, 8 comprises the same material composition as the contact elements 5, 6. Before the melting off, the regions of the contact elements 5, 6 protrude beyond the base body 2, for example.

The contact elements 5, 6 each extend along a lateral surface 23 of the base body 2 over a first edge 9 of the base body in the direction of a second edge 10 of the base body 2. The sections arranged on the contact surfaces 3, 4 are referred to in the present case as contact sections 11, 12. The contact sections 11, 12 are arranged on the lateral surface 23 in a top view of the lateral surface 23. The contact elements 5, 6 each protrude beyond the first edge 9, so that they are suitable in this section for installation of the component 1 in a housing or a sensor device. These sections are referred to in the present case as freestanding sections 13, 14. The freestanding sections 13, 14 can also not be provided.

The contact elements 5, 6 do not protrude beyond the second edge 10. The connecting wires 3, 4 can be melted partially or melted off in the vicinity of the second edge 10. The total material thickness $d_3$ of intact and molten contact element, i.e., the material also including the solidified molten material 7, 8, in the vicinity of the second edge 10 is less than the thickness $d_1$ of the contact element in the freestanding section 13, 14. The maximum total material thickness $d_2$ in the contact section 13, 14 is, for example, greater than or equal to the thickness $d_1$ in the freestanding section.

The connecting material 7, 8 is formed as a welding bead having a dome-shaped surface. The connecting material 7, 8 can have the shape of a spherical segment. It can be seen in FIG. 1A that the connecting material 7, 8 extends up to the second edge 10. The maximum total material thickness $d_2$ in the contact section 11, 12 is provided, for example, at the vertex of a welding bead. The welding bead does not necessarily have to be arranged centrally on the base body 2.

This geometry is created, for example, by the fastening method described hereafter by melting off protruding wire ends. Similar fastenings can be formed by melting off other regions of the contact elements. One advantage of this geometry is that the contact elements 3, 4 each extend only up to the second edge 10 of the base body 2, but because of the reduced diameter there, they have less attack area for mechanical damage, in particular tearing off of the contact elements 5, 6 in the vicinity of the second edge 10.

In addition, it is possible due to the self-stopping process that the connecting material 7, 8 extends up to the second edge 10 and does not completely flow further in the direction of the first edge 9. Moreover, such fastenings of the contact elements 5, 6 can be produced cost-effectively and offer a high stability. Moreover, thermal damage of the base body 2 and the contact surfaces 3, 4 can be avoided, since direct heating of the base body 2 and in particular of the contact surfaces 3, 4 does not take place in the method.

Due to the partial melting off of the contact elements 5, 6 in the contact section 11, 12 in the region of the first edge 10, a part of the connecting material 7, 8 is also formed by the melted-off material in the contact section 11, 12. However, the quantity of the connecting material 7, 8 is greater than the quantity of the melted-off material of the contact elements 5, 6 in the contact section 11, 12, so that it is apparent that the connecting material 7, 8 is also formed by melted-off protruding ends of the contact elements 7, 8. No material other than the molten material of the contact elements 7, 8 is required for connecting the contact elements 7, 8 to the base body 2.

Figure 1B:
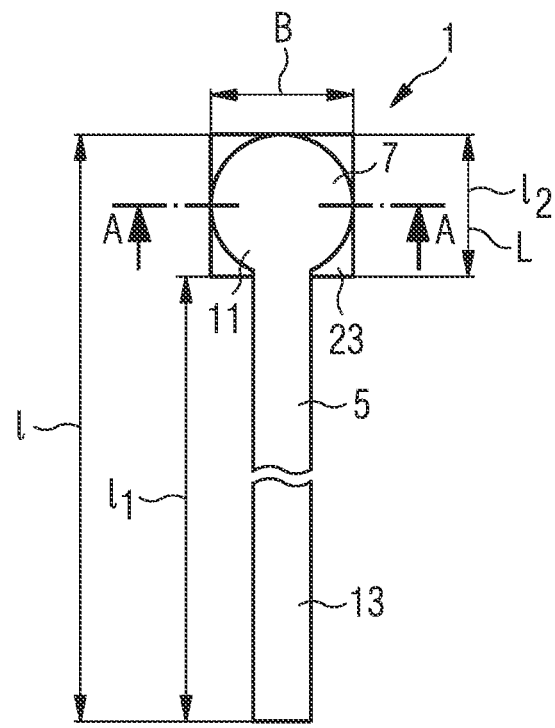
FIG. 1B shows the component from FIG. 1A in a rotated lateral view.
Figure 1C:
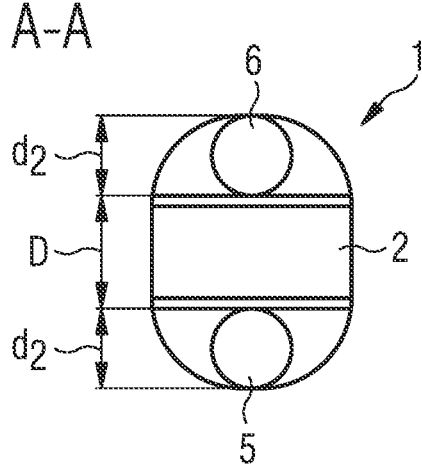
FIG. 1C shows the component from FIG. 1A in a cross-sectional view.

FIG. 1B shows the component 1 from FIG. 1A in a lateral view rotated by 90°. FIG. 1C shows the component 1 in a cross section in a region of the contact section 11, 12 having maximum material thickness $d_2$. The plane of section is indicated in FIG. 1B by the identification A-A.

The freestanding sections 13, 14 of the contact elements 5, 6 each have, for example, a significantly greater length $l_1$ than the length L of the base body 2. The contact sections have, for example, lengths $l_2$ which correspond to the length L of the base body 2 or have somewhat shorter lengths 12.

The base body 2 has, for example, a length L up to a few millimeters. In particular, the length L can be between 0.35 and 2.50 mm. The base body 2 has, for example, a square lateral surface, so that the length L corresponds to the width B of the base body 2. The thickness D of the base body 2 is, for example, in the range of up to 1 mm. In particular, the thickness D can be in the range of 0.2 mm to 0.8 mm.

FIGS. 2A, 2B show a contact element 5 in the form of a connecting wire before its fastening on the base body 2 in cross section and in a lateral view, respectively.

The contact element 5 has a cross section in the form of a circular surface having a diameter d. The contact element can also have another cross-sectional shape. For example, it can also be a rectangular wire. The diameter d of the wire is uniform before the fastening on the base body 2 in the entire length of the wire. The diameter d corresponds to the diameter $d_1$ of the freestanding section 13 from FIG. 1A.

The contact element 5 has a length $l_0$. The length $l_0$ is in particular substantially longer than the length L of the base body 2. Moreover, the length $l_0$ is longer than the total length l of the contact element 5 in the fastened state. This is because the contact element 5 is partially melted off in its length for the fastening on the base body 2.

The base body 2 is shown before its contacting with the contact elements 5, 6 in FIGS. 3A and 3B.

The thickness D is in this case the length of the connection between the contact surfaces 3, 4. The length L is the extension of the base body in a direction defined by the length l of the contact element attached later. The width B is the extension perpendicular to the thickness D and perpendicular to the length L. The base body 2 comprises, for example, square lateral surfaces, so that B=L. The base body can also have a different shape.

The contact surfaces 3, 4 each cover the entire lateral surface. It is also possible that the contact surfaces 3, 4 each only cover a part of the lateral surface.

A method for producing a fastening of contact elements 5, 6 on a base body 2 of an electrical component 1 is explained in greater detail hereafter on the basis of FIGS. 4A to 4E. In each of these figures, the respective method step is illustrated in a view from above of the component to be manufactured (top partial figure), in a lateral view (left partial figure), and in a lateral view rotated by 90° (right partial figure). The component 1 shown can comprise all structural and functional properties of the above-described component 1.

At the beginning of the method, two contact elements 5, 6 and one base body 2 are provided, for example, as shown in FIGS. 2A, 2B, 3A, 3B. In particular, the contact elements 5, 6 can be connecting wires. However, these can also be other contact elements, for example, a stamped grating. The base body 2 can comprise a ceramic as a base material. The base body 2 can also be formed as a type of printed circuit board.

Figure 4A:
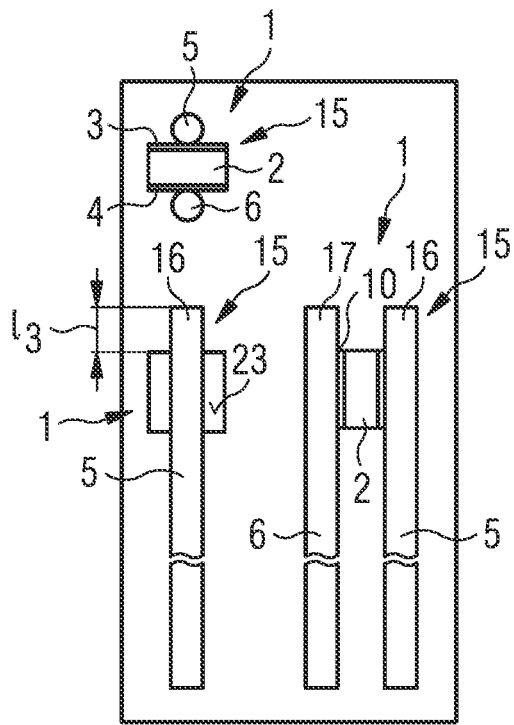

The contact elements 5, 6 are then arranged on contact surfaces 3, 4 of the base body 2, as shown in FIG. 4A.

In this method step, the contact elements 5, 6 still have a uniform diameter d. The contact elements 5, 6 are only arranged on the base body 1, for example, by means of a gripper, but are not yet permanently fastened.

The arrangement 15 is positioned, for example, in such a way that the protruding ends which form the regions 16, 17 to be melted off are oriented upward. This ensures that during the following method steps, the molten material of the regions 16, 17 flows in the direction of the base body 2 because of the force of gravity. An orientation upward does not necessarily have to be provided, in particular if the favorable wetting properties of the contact surfaces 3, 4 ensure the automatic wetting with the molten material.

The regions 16, 17 extend beyond the second edge 10 of the base body 2. For example, the length $l_3$ of a protruding end is at least half as large as the length L of the base body 2. For example, the length $l_3$ of a protruding end is at most twice as large as the length L of the base body 2. The solidified molten material 7, 8 for fastening the connecting wires 5, 6 on the base body 2 is formed from the material of the protruding ends, i.e., the regions 16, 17.

For example, the length $l_3$ of a protruding end is at most three times as large as the shortest extent of the lateral surface, for example, the width B of the lateral surface 23 of the base body (see FIG. 1B). For example, the length $l_3$ of the protruding region 16, 17 before the melting procedure is greater than the thickness d of the contact elements 5, 6, for example, at least three times as long as the thickness d of the contact element 5, 6. This enables a stable fastening of the contact element with the narrowest possible shape of the component 1.

Preheating of the base body 2 can optionally be performed in this method step to avoid damage due to heat shock. For this purpose, for example, the base body 2 can be heated by a holder, in particular also by heating the contact elements 5, 6. Alternatively or additionally thereto, the base body 2 can be heated by laser action. This is performed by gentle heating before the subsequent laser welding method.

Figure 4B:
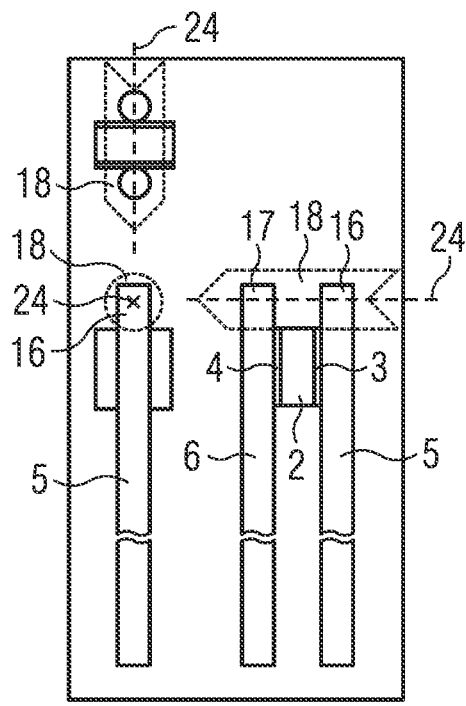

FIG. 4B shows the beginning of the actual melting method. In this case, a laser beam 18 is directed onto the regions 16, 17. The laser beam 18 is directed here so that direct heating of the base body 2 and in particular the contact surfaces 3, 4 does not occur, so that the base body 2 and in particular the contact surfaces 3, 4 are not damaged by heat. In particular, the contact surfaces 3, 4 are not located in the beam direction 24 of the laser beam 18. The laser beam 18 runs past completely above the base body 2.

Here, the laser beam 18 is directed in the present case so that both protruding regions 16, 17 are located in its beam direction 24. This enables melting off of both protruding regions 16, 17 without repositioning of the laser beam 18. Alternatively, the laser beam 18 can be directed so that only one protruding region 16 is located in the beam direction 24. In this case, a repositioning of the laser beam 18 or incident radiation of a further laser beam can be required, which processes the further region 17.

Due to the heat impact of the laser beam 18, initially the region 16 is melted off, which is first struck by the laser beam 18. The second region 17 is still shaded by the first region 16.

Figure 4C:
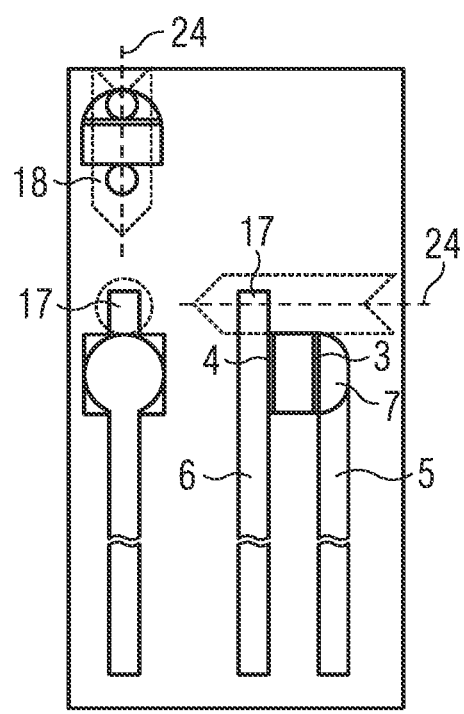

In FIG. 4C it is shown how one protruding end, i.e., the region 16, is completely melted off, while the other protruding end, i.e., the region 17, is still present.

The molten material spreads along the contact element 5 in the direction of the base body 2 and wets the contact surface 3 and the contact section 11 of the contact element 5 there. Due to the melting off of the region 16, the laser beam 18 no longer acts on the first contact element 5, so that no or only minor energy absorption and thus no significant heating of the contact element 5 is still provided. The material thus solidifies and forms the connecting material 7, which permanently electrically and mechanically connects the contact element 5 to the contact surface 3 of the base body 2.

The further protruding section, i.e., the region 17, is now struck directly by the laser beam 18, heated, and melted off.

Figure 4D:
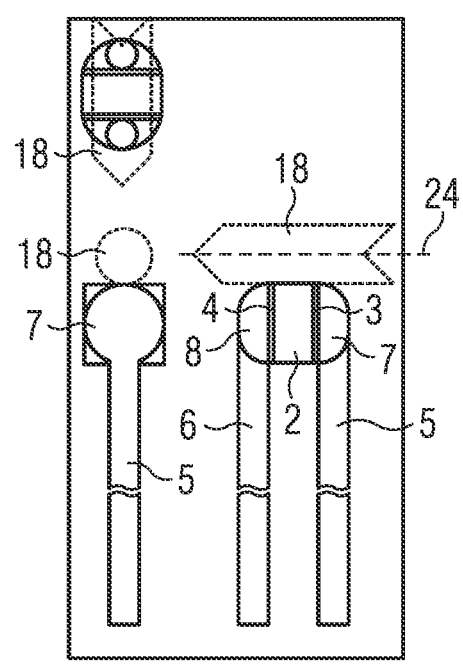

FIG. 4D shows how the further region 17 is also completely melted off.

Similarly to the first protruding region 16, the molten material 8 runs along the connecting wire 6 in the direction of the base body 2 and wets the further contact surface 4 and the further contact section 12 there. Due to the melting off of the further protruding region 17, the laser beam 18 no longer strikes on the connecting wire 6, so that energy absorption and thus heating of the connecting wire 6 is no longer provided. The material 8 thus solidifies and results in the electrical and mechanical connection of the contact element 6 to the contact surface 4 of the base body 2.

The laser beam 18 now leads completely past the component 1, so that heat impact no longer takes place and it can now be switched off.

FIG. 4E shows the component 1 having contact elements 5, 6 fastened on both sides. The contact elements 5, 6 are now permanently electrically and mechanically fastened by the connecting material 7, 8 on the contact surfaces 3, 4 of the base body 2.

The component 1 can now be further processed, for example, by coating using a polymer, glass, or application of other jackets. In dependence on the material combination and requirements from the final application, the described method can implement sufficient mechanical stability, which makes a further mechanical protection of the connecting point in the form of a jacket superfluous. The stability of the connecting point in such methods with respect to environmental influences, for example, moisture, can also be sufficiently high that a further protection in the form of a jacket is not necessary.

The component 1 can be formed in particular as in FIGS. 1A, 1B, and 1C. Reference is made to the description of these figures for the properties of the component 1.

Various embodiments of single-layer or multilayered contact surfaces 3, 4 for a base body 2 of a component 1 will be described with reference to FIG. 5. The described embodiments of the contact surfaces 3, 4 are particularly suitable for the above-described laser welding method, but can also be advantageous in other methods for fastening a contact element. These are in particular welding methods such as deep welding, arc welding, thermal compression welding, or resistance welding, or also soldering methods.

The contact surfaces 3, 4 each comprise, for example, at least one nickel layer. Moreover, the connecting wires 5, 6 can also each comprise nickel.

In a first embodiment, the contact surfaces 3, 4 are each embodied as single-layer. In particular, the contact surfaces 3, 4 each consist of a nickel layer. The nickel layer is thus in direct contact with the base material 19 of the base body 2. Moreover, the nickel layer is in direct contact with the material of the connecting wire 5, 6. In this case, this can be an un-melted section of the connecting wire 5, 6 and/or the solidified molten material 7, 8.

In further embodiments, the contact surface 3, 4 has a multilayered structure. The layers of the contact surface can be applied to the base body 2 by sputtering, for example.

In this case, a lowermost layer is applied directly to the base material 19 of the base body 2. An upper layer is arranged above the lowermost layer and can in particular be in direct contact with the connecting wire 5, 6 and/or the connecting material 7, 8 as the uppermost layer.

The upper layer is used, for example, for oxidation protection. Moreover, the upper layer can promote the welding procedure by inhibiting crystal growth and by possibly absorbing thermal energy. For example, the upper layer is a gold or silver layer.

The contact surface 3, 4 can in this case comprise a two-layered structure, in particular a structure consisting of a nickel layer as the lowermost layer and a gold or silver layer as the upper or uppermost layer.

In a further embodiment, the contact surface 3, 4 comprises a lower layer, which is used as an adhesion promoter for a further layer applied thereon. Moreover, the lower layer can be used to prevent complete melting of the contact surface 3, 4 during the welding procedure and detachment of the electrode from the ceramic.

For example, the lower layer is a chromium layer. The upper layer is, for example, a nickel layer.

The contact surface 3, 4 can in this case comprise a two-layered structure, in particular a structure consisting of a chromium layer as the lowermost layer and a nickel layer as the upper layer. In addition, a gold or silver layer can be applied to the nickel layer, so that the nickel layer forms a middle layer and the gold or silver layer forms an upper layer.

FIG. 5 shows in this case an embodiment of the contact surfaces 3, 4 each having at least three layers 20, 21, 22. For example, the contact surfaces each comprise at least two nickel layers 20, 22. In this case, the layer structure can be as described above, wherein a further layer 21 formed as a protective layer, in particular a chromium layer, is arranged below an upper nickel layer 22. A lowermost nickel layer 20 can now be arranged between the protective layer 21 and the base material 19. The protective layer 21 prevents melting of the underlying nickel layer 20 here due to a significantly higher melting point.

A temperature-dependent and time-dependent resistance drift can be reduced by the lower nickel layer 20. Alternatively or additionally thereto, the adhesion of the electrode can be improved by minimizing the thermomechanical strain.

For example, the contact surface 3, 4 can comprise a layer sequence of nickel layer, chromium layer, and nickel layer and in particular can be formed three-layered here. The contact surface 3, 4 can in a further embodiment also comprise an uppermost layer, for example, a gold or silver layer, and in particular can be formed four-layered here. The uppermost layer can be used in this case for oxidation protection and can promote the welding procedure.

Instead of the above-mentioned metals, other metals or alloys can also be used which have a comparable technical effect.

FIGS. 6A to 6E show method steps of a further embodiment of a method for producing a contact in an electrical component 1. In each of these figures, the respective method step is illustrated in a view from above of the component to be manufactured (top partial figure), in a lateral view (left partial figure), and in a lateral view rotated by 90° (right partial figure).

The component 1 is designed, for example, as a temperature sensor. The base body 2 comprises, for example, a ceramic or another insulating material. The base body 2 comprises two contact surfaces 3, 4 in the form of two metallic contact surfaces. The contact surfaces 3, 4 are used for contacting a temperature-dependent resistor, which is provided here in meandering form. However, this can also be a different component 1.

In contrast to the method and component 1 of FIGS. 4A to 4E, the contact surfaces 3, 4 are arranged on the same lateral surface 23 of the base body 1. Two contact elements 5, 6 are provided and are respectively arranged on one of the contact surfaces 3, 4. The contact elements 5, 6 are formed as wires as in FIGS. 4A to 4E, however, it can also be another form, for example, a grating.

In contrast to FIGS. 4A to 4D, the contact elements 5, 6 do not protrude beyond the base body 1 in a top view of the lateral surface 23. The contact elements 5, 6 each comprise a region 16, 17, which leads away from the plane of the lateral surface 23. This can be seen in particular in a viewing direction parallel to the lateral surface as in the illustration on the bottom right in FIG. 6A. The region 16, 17 is in particular bent away from the contact surface 3, 4. The contact elements 5, 6 thus each comprise a region 16, 17 which is arranged at a greater distance from the contact surface 3, 4 than a region of the contact element 5, 6 adjoining thereon. In a top view of the contact surface 3, 4, the region 16, 17 is arranged on the contact surface 3, 4.

Figure 6A:
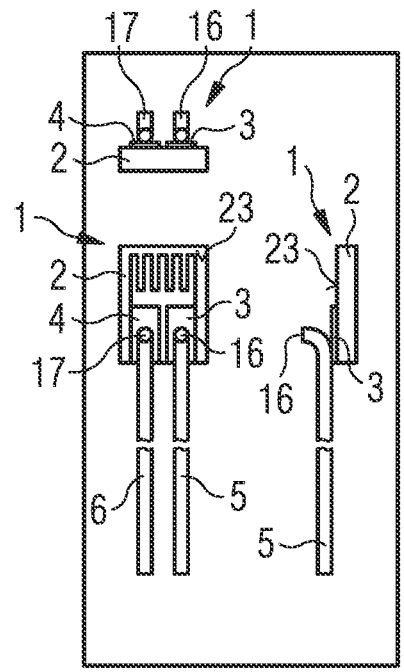
Figure 6B:
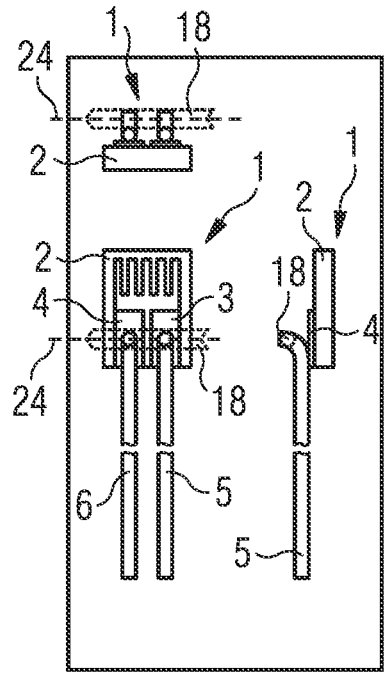

According to FIG. 6B, a laser beam 18 is directed onto the regions 16, 17 of the contact elements 5, 6 in such a way that the base body 2 and in particular the contact surfaces 3, 4 are not located in the beam direction 24 of the laser beam 18. The beam direction 24 extends here at a distance to the lateral surface 23 in parallel to the lateral surface 23. The laser beam 18 in this case first strikes the region 16 of the first contact element 5, so that this region 16 is melted off and withdraws from the laser beam 18 and the molten material 7 wets the first contact surface 3.

Figure 6C:
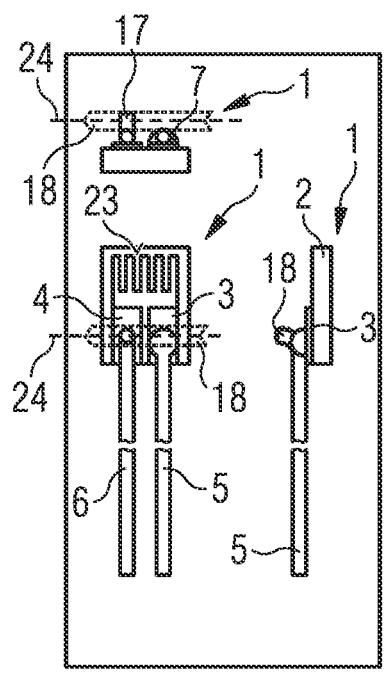

As shown in FIG. 6C, the laser beam 18, after the melting off of the region 16 of the first contact element 5, strikes directly on the region 17 of the second contact element and melts off this region 17, so that the region 17 withdraws from the laser beam 18 and the molten material 8 wets the second contact surface 4.

Figure 6D:
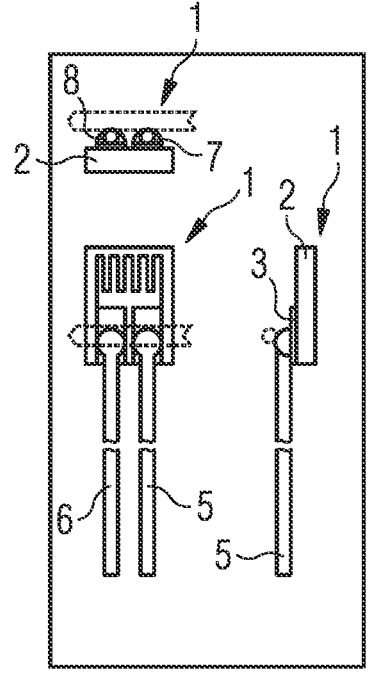

As shown in FIG. 6D, the laser beam 18 extends past the base body 2 and the contact elements 5, 6 after melting off of the second region 17 and no or only minor energy absorption occurs, so that the process is self-stopping and damage to the base body 2 is avoided. The molten material 7, 8 solidifies and results in fastening of the contact elements 5, 6 on the contact surfaces 3, 4 of the base body 2.

FIG. 6E shows the component 1 having the fastened contact elements 5, 6.

The method shown in FIGS. 6A to 6E can also be modified. For example, the contact elements 5, 6 can also be arranged on different sides of the base body 2. In this case, two different laser beams 18 can be used for melting off the contact elements 5, 6 or the base body 2 or the laser beam 18 can be repositioned.

Furthermore, it is also conceivable that the region 16 to be melted off is not formed as an end of a contact element 5, but rather is arranged in a middle section of the contact element 5. In this case, a contact element 5 can also be separated into two contact elements by melting the region 16, which are each fastened in a single method step by the molten material on different contact surfaces.

FIGS. 7A to 7E show method steps of a further embodiment of a method for producing a contact in an electrical component 1.

Figure 7A:
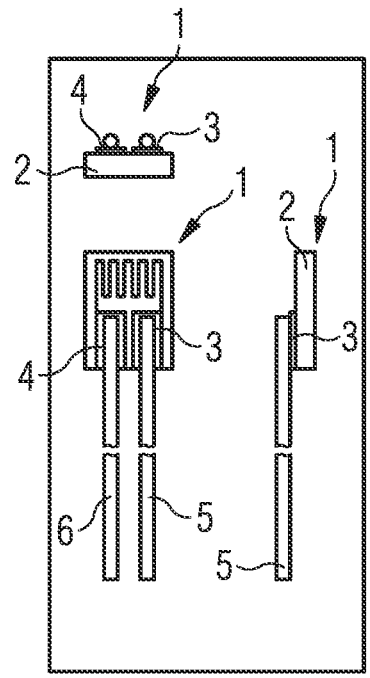
FIGS. 7A-7E show a further embodiment of the method for producing a contact.

According to FIG. 7A, contact elements 5, 6 are arranged on contact surfaces 3, 4 of a base body 2. In contrast to the method and component 1 according to FIGS. 6A to 6E, the contact elements 5, 6 do not protrude from the contact surfaces 3, 4.

Figure 7B:
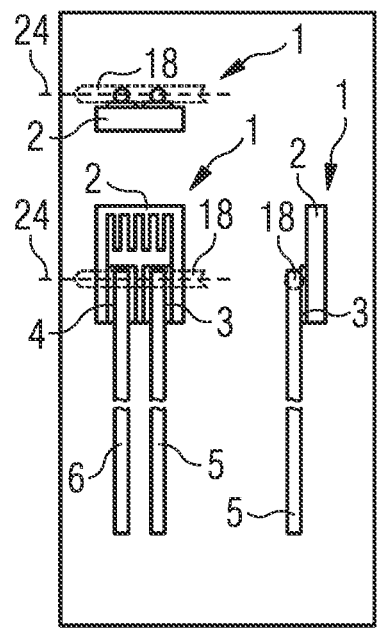

As shown in FIG. 7B, the laser beam 18 is directed onto regions 16, 17 of the contact elements 5, 6, so that the base body 2 and in particular the contact surfaces 3, 4 are not located in the beam direction 24 of the laser beam 18. The laser beam 24 extends in parallel to the lateral surface 23, similarly to FIG. 6C, but closer to the lateral surface than in FIG. 6C. The laser beam strikes the region 16 of the first contact element 3 and melts off the region 16, so that the molten material 7 withdraws from the laser beam 18 and wets the first contact surface 3.

Figure 7C:
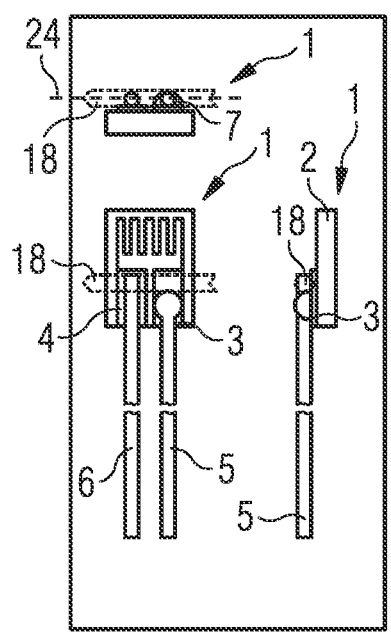

The region 17 of the second contact element 4 is also subsequently melted off, as shown in FIG. 7C.

Figure 7D:
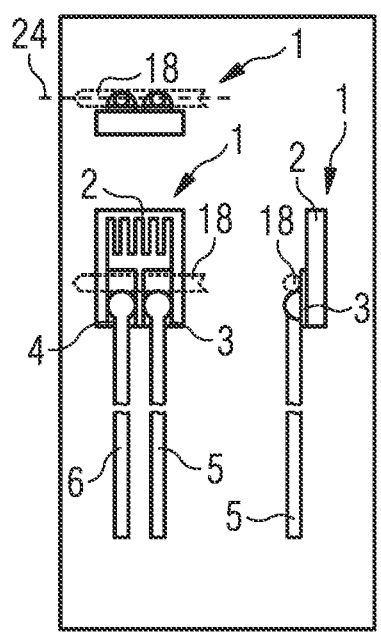

After melting off of the regions 16, 17, as shown in FIG. 7D, the contact elements 5, 6 have withdrawn from the laser beam 18 and the process stops on its own. The hardened material 7, 8 connects the contact elements 5, 6 to the contact surfaces 3, 4.

Figure 7E:
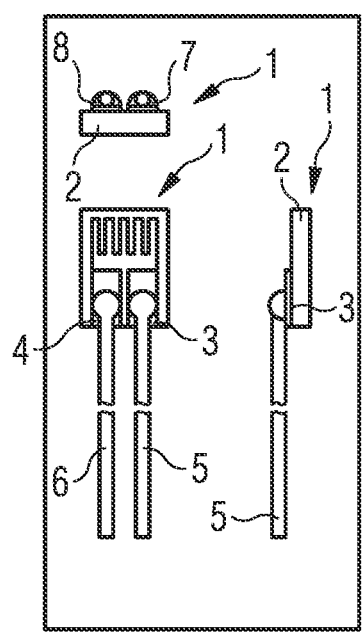

FIG. 7E shows the component 1 having the fastened contact elements 5, 6. The component 1 does not differ in the present case from the component 1 of FIGS. 6A to 6E. This is because in the method according to FIG. 7A, the contact elements 5, 6 are arranged with a larger proportion on the contact surface 3, 4 before the melting procedure than in the method according to FIG. 6A.

Modifications are also possible in the method according to FIGS. 7A to 7E. For example, a contact element 5 can be severed in the middle.

Figure 8A:
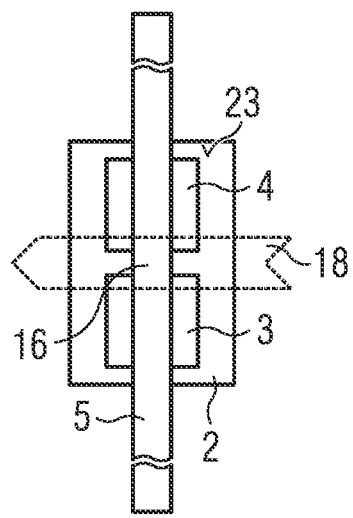
FIGS. 8A and 8B show a further embodiment of the method for producing a contact.
Figure 8B:
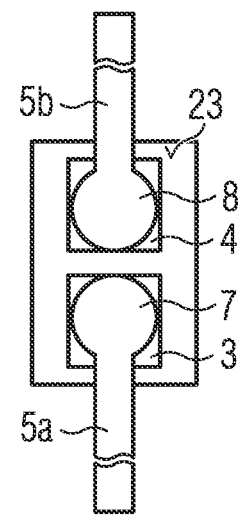

FIGS. 8A to 8B show method steps of a further embodiment of a method for producing a contact in an electrical component 1, wherein only top views of the lateral surfaces, on which a contact element 5 is arranged, are shown here in each case.

In contrast to the preceding embodiments, a contact element 5 is severed here by the melting of a region 16, so that two separated contact elements 5a, 5b are formed.

According to FIG. 8A, the contact element 5 is arranged on a lateral surface 23 of a base body 2. The contact element 5 is formed, for example, as a wire. The base body 2 comprises two contact surfaces 3, 4 separate from one another, on which the contact element 5 rests.

A laser beam 18 is directed onto a region 16 of the contact element 5. The region 16 is not arranged, for example, on one of the contact surfaces 3, 4. The laser beam 18 extends past the base body 2 in parallel to the contact surfaces 3, 4, corresponding to the embodiment from FIG. 7B. The region 16 melts and withdraws from the laser beam 18. In this case, a part of the material 7 wets the first contact surface 3 and a part of the material 8 wets the second contact surface 4.

FIG. 8B shows the component 1 having the separated contact elements 5a, 5b, which are respectively fastened on the contact surfaces 3, 4. The contact elements 5a, 5b can be connected to different electrical poles.

Figure 9A:
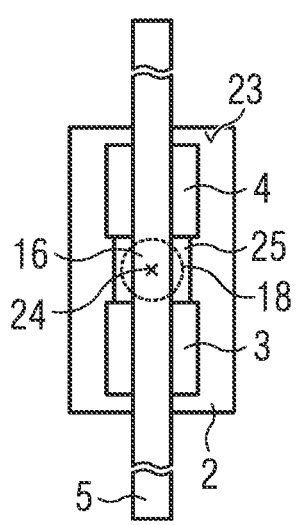
FIGS. 9A and 9B show a further embodiment of the method for producing a contact.
Figure 9B:
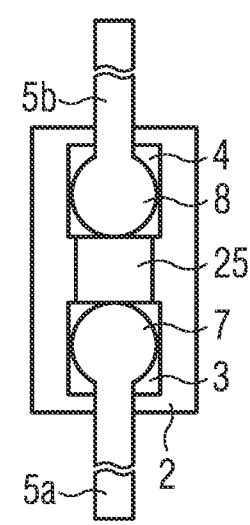

FIGS. 9A and 9B show method steps of a further embodiment of a method for producing a contact in an electrical component 1, wherein only top views of the lateral surfaces, on which a contact element 5 is arranged, are shown here in each case.

In contrast to the preceding embodiments, the laser beam 18 leads through a cutout 25 in the base body 2.

According to FIG. 9A, a contact element 5 is arranged on a lateral surface 23 of a base body 2. In particular, the contact element 5 rests on two separate contact surfaces 3, 4. The base body 2 comprises a cutout 25, which leads completely through the base body 2, between the contact surfaces 3, 4.

A laser beam 18 is oriented in such a way that the beam direction 24 leads through the cutout 25 of the base body 2. The base body 2 is not located in the beam direction 24 in this case, so that the laser beam 18 also does not strike the base body 2 directly after the melting of a region 16 of the contact element 5. The laser beam 18 in particular extends perpendicularly to the contact surfaces 3, 4.

The region 16 melts and withdraws from the laser beam 18. In this case, a part of the material 7 wets the first contact surface 3 and a part of the material 8 wets the second contact surface 4.

FIG. 9B shows the component 1 having the separate contact elements 5a, 5b, which are respectively fastened by the molten material 7, 8 on the contact surfaces 3, 4. The contact elements 5a, 5b can be connected to different poles.

FIGS. 10A and 10B show method steps of a further embodiment of a method for producing a contact in an electrical component 1.

Similarly to FIGS. 9A and 9B, as shown in FIG. 10A, the laser beam 18 leads through a cutout 25 in the base body 2 here. In contrast to FIGS. 9A and 9B, the contact element 5 ends here above the cutout 25. The region 16 is melted off, so that the molten material 7 wets the contact surface 3 and fastens the contact element 5 on the base body 2. This method variant is thus similar to the variant of FIGS. 4A to 4D with respect to the beam direction 24 of the laser 18 and the arrangement of the contact element 5, but differs in that the region 16 to be melted off is arranged above a cutout 25 and the laser beam 18 extends through the cutout 25.

FIG. 10B shows the component 1 having the contact element 5, which is fastened on the contact surface 3 of the base body 1. The contact surface 3 directly adjoins, for example, the cutout 25.

Further embodiments result from a combination of the embodiments described here. For example, in the embodiments of FIGS. 9A to 10B, the regions 16 can protrude from the base body similarly to FIG. 6A.

LIST OF REFERENCE SIGNS 1 component
2 base body
3 contact surface
4 contact surface
5 contact element
5a separated contact element
5b separated contact element
6 contact element
7 molten material
8 molten material
9 first edge
10 second edge
11 contact section
12 contact section
13 freestanding section
14 freestanding section
15 arrangement
16 region
17 region
18 laser beam
19 base material
20 lowermost layer of the contact surface
21 middle layer of the contact surface
22 upper layer of the contact surface
23 lateral surface
24 beam direction
25 cutout
$d_1$ material thickness in the freestanding section
$d_2$ maximum material thickness in the contact section
$d_3$ material thickness at second edge
$d_0$ diameter of contact element before fastening on the base body
$l_1$ length in freestanding section
$l_2$ length in contact section
$l_3$ length of the protruding end
l length after fastening on the base body
$l_0$ length before fastening on the base body
L length of the base body
B width of the base body
D thickness of the base body

The invention claimed is:

1. A method of fastening a contact element in an electrical component, comprising:
   A) providing a base body comprising a contact surface and providing a contact element,
   B) arranging the contact element on the contact surface,
   C) directing a laser beam onto a region of the contact element and thus partially melting the contact element so that the molten material wets the contact surface,
   wherein the laser beam is directed such that the base body is not struck by the laser beam after the partial melting of the contact element, and
   the laser beam is directed onto the contact element until enough material of the contact element moves out of the laser beam so that heating of the contact element by the laser beam automatically stops.

2. The method according to claim 1, wherein the contact element is formed as a wire.

3. The method according to claim 1, wherein the region protrudes beyond the base body in a top view of the contact surface.

4. The method according to claim 1, wherein the region leads away from the contact surface in a direction perpendicular to the contact surface.

5. The method according to claim 1, wherein, before the melting of the region, the region abuts the contact surface.

6. The method according to claim 1, wherein the beam direction does not overlap with the base body in a top view of the contact surface.

7. The method according to claim 1, wherein the beam direction extends at a distance in parallel to the contact surface.

8. The method according to claim 1, wherein a first and a second contact element are provided and arranged on the base body, and the laser beam is directed in such a way that both contact elements are located in the beam direction.

9. The method according to claim 8, wherein, before the partial melting of the first contact element, the second contact element is shaded and after the partial melting of the first contact element, the second contact element is struck by the laser beam and melted off.

10. The method according to claim 1, wherein a first and a second contact element are provided and arranged on the base body, and the laser beam is directed such that only the first contact element is located in the beam direction of the laser beam.

11. The method according to claim 10, wherein, after the partial melting of the first contact element, the laser beam and/or the component is reoriented such that the other contact element is struck by the laser beam or in which a further laser beam is used to partially melt the second contact element.

12. The method according to claim 1, wherein the base body comprises a cutout, the contact element is arranged before the melting such that the region is arranged on the cutout in a top view of the contact surface, and the beam direction leads through the cutout.

13. The method according to claim 1, wherein the contact element is divided into two separated contact elements during the partial melting.

14. The method according to claim 1, wherein the base body comprises a ceramic material as a base material, and the contact surface is a metallization.

15. A method of fastening a contact element in an electrical component, comprising:
   A) providing a base body comprising a contact surface and providing a contact element,
   B) arranging the contact element on the contact surface, and
   C) directing a laser beam onto a region of the contact element and thus partially melting the contact element so that the molten material wets the contact surface,
   wherein the laser beam is directed such that the base body is not struck by the laser beam after the partial melting of the contact element,
   a first and a second contact element are provided and arranged on the base body, and
   the laser beam is directed such that both contact elements are located in the beam direction in which, before the partial melting of the first contact element, the second contact element is shaded and after the partial melting of the first contact element, the second contact element is struck by the laser beam and melted off.

16. A method of fastening a contact element in an electrical component, comprising:
   A) providing a base body comprising a contact surface and providing a contact element,
   B) arranging the contact element on the contact surface, and
   C) directing a laser beam onto a region of the contact element and thus partially melting the contact element so that the molten material wets the contact surface,
   wherein the laser beam is directed such that the base body is not struck by the laser beam after the partial melting of the contact element, and
   a first and a second contact element are provided and arranged on the base body, and
   the laser beam is directed such that only the first contact element is located in the beam direction of the laser beam.

17. The method according to claim 16, wherein, after the partial melting of the first contact element, the laser beam and/or the component is reoriented such that the other contact element is struck by the laser beam or a further laser beam is used to partially melt the second contact element.

18. A method of fastening a contact element in an electrical component, comprising:
   A) providing a base body comprising a contact surface and providing a contact element,
   B) arranging the contact element on the contact surface, and
   C) directing a laser beam onto a region of the contact element and thus partially melting the contact element so that the molten material wets the contact surface,
   wherein the laser beam is directed such that no further parts of the electrical component are located in a beam direction of the laser beam in an area shaded by the contact element before partial melting of the contact element such that the electrical component is not struck by the laser beam after the partial melting of the contact element.

* * * * *